United States Patent [19]

Swinehart

[11] Patent Number: 4,550,361
[45] Date of Patent: Oct. 29, 1985

[54] ADJUSTABLE MULTITURN AIR DIELECTRIC CAPACITOR

[75] Inventor: Frank Swinehart, Waseca, Minn.

[73] Assignee: E. F. Johnson Company, Waseca, Minn.

[21] Appl. No.: 619,061

[22] Filed: Jun. 11, 1984

[51] Int. Cl.⁴ ............................................. H01G 5/22
[52] U.S. Cl. ................................................. 361/295
[58] Field of Search ................ 361/292, 294, 295, 296

[56] References Cited

U.S. PATENT DOCUMENTS

| 3,196,331 | 7/1965 | Blickstein et al. | 361/295 |
| 3,239,730 | 3/1966 | Farago | 361/295 X |
| 3,262,033 | 7/1966 | Culbertson | 361/295 |
| 3,341,756 | 9/1967 | Johanson | 361/295 |
| 3,353,074 | 11/1967 | Mittler et al. | 361/295 |
| 3,361,945 | 1/1968 | Mittler et al. | 361/295 |
| 3,382,421 | 5/1968 | Hirschberg | 361/296 X |
| 3,432,734 | 3/1969 | Johanson | 361/294 X |
| 3,469,160 | 9/1969 | Johanson | 361/296 X |
| 3,476,994 | 11/1969 | Blickstein et al. | 361/298 |
| 3,483,450 | 12/1969 | Blickstein et al. | 361/296 |
| 3,506,894 | 4/1970 | Johanson et al. | 361/296 |
| 3,512,059 | 5/1970 | Johanson | 361/296 X |
| 3,536,967 | 10/1970 | Johanson | 361/296 |
| 3,543,107 | 11/1970 | Johanson et al. | 361/296 X |
| 3,584,271 | 6/1971 | Blickstein et al. | 361/294 |
| 3,624,469 | 11/1971 | Johanson | 361/296 X |
| 4,464,699 | 8/1984 | Bunce et al. | 361/296 |
| 4,472,759 | 9/1984 | Beckman | 361/295 |

FOREIGN PATENT DOCUMENTS 1806018 10/1968 Fed. Rep. of Germany .
805463 8/1936 France .

Primary Examiner—Donald A. Griffin
Attorney, Agent, or Firm—Dorsey & Whitney

[57] ABSTRACT

A miniature multiturn electrical capacitor is provided that includes low cost, high precision, die cast components and a unique spring biasing means to ensure electrical contact and torque between the rotor and the housing of the capacitor to enhance capacitor performance. The spring biasing means comprises a circular spring which resists compression in the radial direction and engages the inside surface of the flexible tubular rotor to bias the rotor against the internally threaded housing. The torque thus created promotes precise rotor positioning within and electrical contact with the housing.

15 Claims, 4 Drawing Figures

ADJUSTABLE MULTITURN AIR DIELECTRIC CAPACITOR

BACKGROUND OF THE INVENTION

1. Field of the Invention

The present invention relates to adjustable air dielectric capacitors for electrical circuits. More particularly, the invention relates to an inexpensive miniature capacitor having an externally threaded concentric tube rotor which is biased toward and rotatably engages an internally threaded housing to rotate into and out of a fixed concentric tube stator.

2. Description of the Prior Art

Adjustable miniature air dielectric capacitors have been the subject of much inventive activity. One common type of capacitor has a rotor and a stator each in the form of concentric tubes, which intermesh. The stator tubes are secured at one end of an internally threaded housing. The externally threaded rotor rotatably engages the housing threads and is adjustable on the housing threads, into and out of the fixed stator (see U.S. Pat. No. 3,469,160). Capacitance is controlled by the amount of overlap between the concentric stator and rotor tubes.

Another type of capacitor also is provided with rotor and stator plates in the form of concentric tubes mounted within a housing. In accordance with this second type of capacitor, however, the rotor does not rotate while moving into and out of the stator. The nonrotating rotor movement is accomplished by a threaded drive screw upon which the rotor translates while guides on the rotor slide in longitudinal slots in the housing (see U.S. Pat. No. 3,483,450).

Regardless of the construction of an adjustable miniature air dielectric capacitor, there is an inherent need for positive electrical contact between the housing and the rotor and, in addition, for stable, constant rotor position with respect to the stator.

SUMMARY OF THE INVENTION

The present invention provides unique means to ensure unfailing electrical contact between the rotor and the housing as well as to prevent unwanted rotor movement in an adjustable miniature air dielectric capacitor. Moreover, the invention provides rotor securing means in a capacitor design which utilizes high precision, low cost die cast components.

The capacitor hereof broadly includes: a unitary cylindrical elongated housing having a fully threaded internal surface; a cylindrical unitary rotor in the form of concentrically positioned tubes, the outer most tube being formed as a plurality of ribs, the ribs having threaded outer surfaces which engage the interior surface of the housing; a unitary cylindrical stator in the form of concentrically positioned tubes; a circular spring which resists compression in the radially inward direction; and a circular ceramic insulating disc having holes therein for electrical terminals extending from the housing and the stator.

The stator is positioned and secured to the insulating plate which is itself secured to one end of the housing. The concentric stator tubes are oriented inwardly into the housing. The rotor is positioned inside the housing, the concentric rotor tubes being oriented inwardly toward and in operative engagement with the stator tubes. The circular rotor spring is positioned within the outer ribs on the rotor and biases the ribs of the rotor in a cantilever fashion, toward the threaded interior surface of the housing. The stator and the housing have separate terminals for connection to an electrical circuit.

DESCRIPTION OF THE PREFERRED EMBODIMENT

Figure 1:
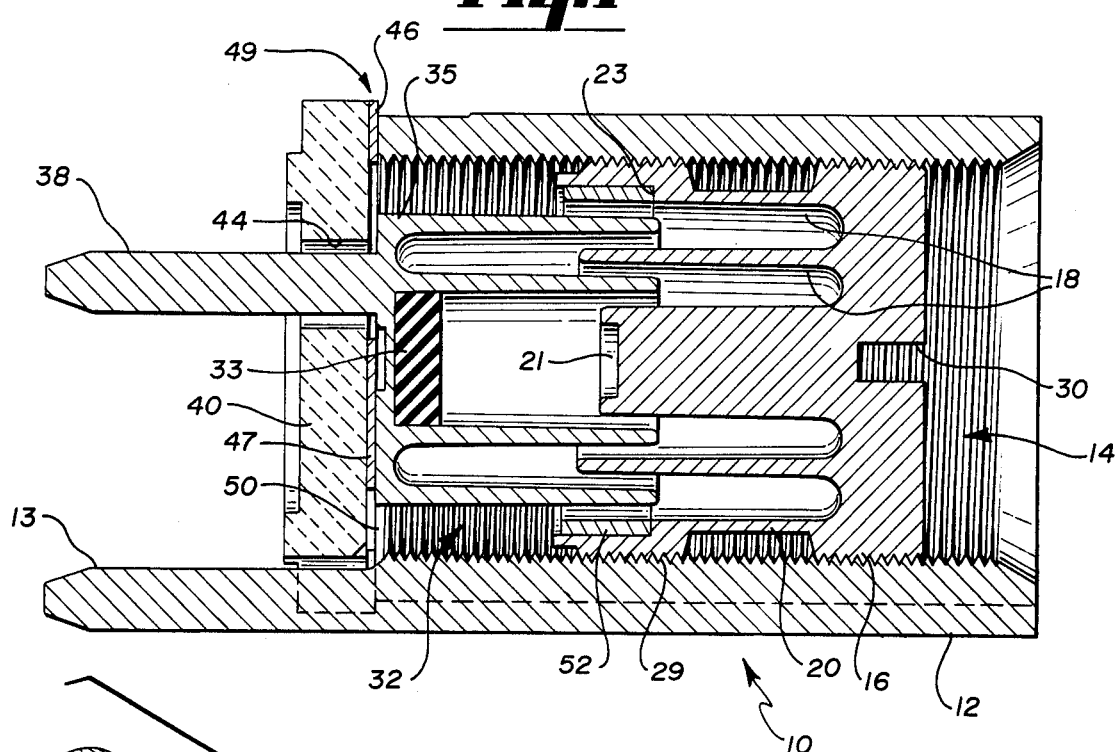
FIG. 1 is a longitudinal cross section of a capacitor in accordance with the present invention.
Figure 2:
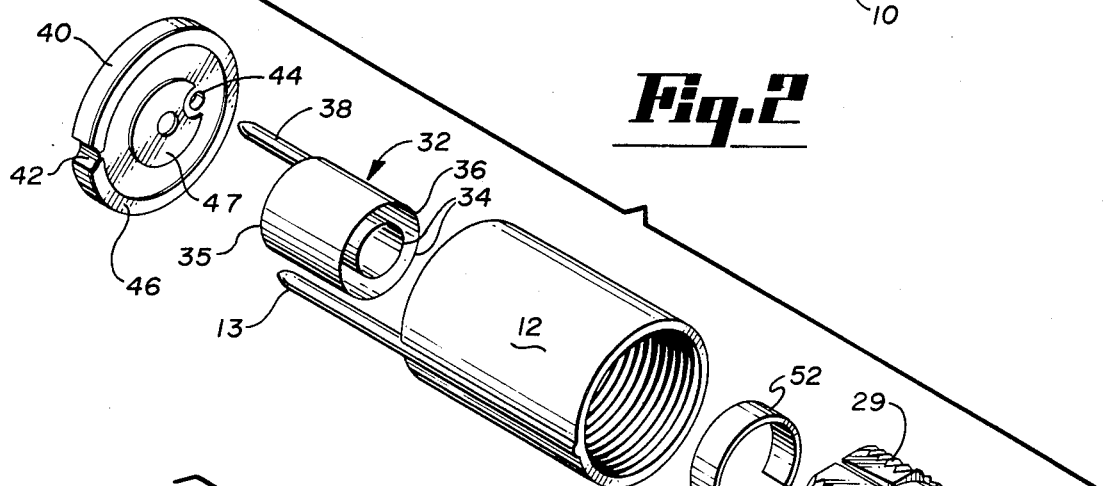
FIG. 2 is an exploded perspective view of the capacitor shown in FIG. 1.

Referring to the drawings, FIGS. 1 and 2, an adjustable air dielectric capacitor 10 in accordance with the present invention broadly includes an elongated housing 12, a rotor 14, a spring 52, a stator 32, and a ceramic insulating plate 40.

The capacitor housing 12 is an elongated cylindrical piece die-cast from metal, preferably zinc, aluminum or a similar metal. The housing 12 is threaded internally throughout its length. In addition, the housing 12 has a terminal 13 extending from one end thereof. The terminal is cast integrally with the other portions of the housing 12.

The rotor 14 is cylindrical and preferably is die cast as one piece from zinc, aluminum or a similar metal. The rotor 14 comprises a base 16 and concentric tubes 18 integral with the base 16. The outermost tube, that is the tube having the greatest diameter, 20 is in the form of a plurality of ribs 22. Each rib 22 occupies an equal arc of the circumference of the base 16. And each rib 22 is equally spaced about the base 16. The base 16 is threaded about its outer periphery with threads 28. The ribs 22, have threads 29, which are similar to the threads 28 on the base 16. Furthermore, the diameter of the rotor 14 is the same at both sets of threads 28 and 29.

The other rotor tubes 18 are of smaller diameter than rotor tube 20 and are concentrically positioned in the space defined by tube 20. The smallest tube has a closed end 21.

The base 16, in addition to threads 28, has a screwdriver slot 30 on the side opposite the side having the tubes 18. It should also be appreciated that the screwdriver slot 30 may be instead a square or a hex shaped cavity.

The stator 32, like the rotor 14, utilizes concentric tubes 34. The outer tube, that is the tube of greatest diameter, 36 unlike the outer rotor tube 20, is continuous, that is, not ribbed. The outermost stator tube 36 is of lesser diameter than the outer rotor tube 20. Likewise, each successive stator tube is of lesser diameter than the corresponding rotor tube.

Extending from the base 35 of the stator is a terminal 38 similar to the housing terminal 13. Also part of the stator 32 is a circular insulating stop 33 within the confines of the innermost tube at the base 35 of the stator 32. The diameter of the stop is slightly less than the diameter of the space defined by the innermost tube on the stator 32. The height of the stop 33 represents only a small fraction of the total height of the stator 32.

The ceramic insulating disc 40 is a flat circular piece having a diameter roughly equal to that of the housing 12. The insulating disc 40 has an edge hole 42 in its circumference and a hole 44 near its center. The insulating disc 40 also has metallized portions 46 and 47. The metallized portion 46 is a thin strip of metal deposited around the outer edge of the upper surface of the insulating disc 40. The metallized portion 47 is a circular shaped metallized region in the center of the insulating disc 40. The metallized portion 47 nearly surrounds the hole 44 in the insulating disc 40.

Figure 3:
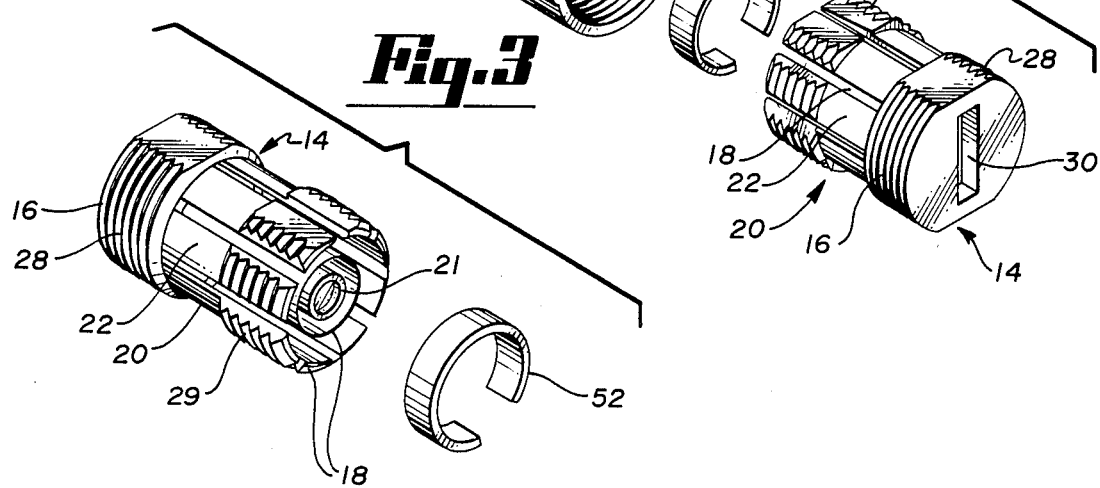
FIG. 3 is an exploded perspective view of a portion of the capacitor shown in FIG. 1.

As seen in FIG. 3, the rotor spring 52 is circular in shape. Its circumference, however, does not measure a full 360 degrees, that is, the spring is of less than one turn. The spring 52 resists compression in the radially inward direction. It should also be appreciated that springs of more than one turn may be used.

The precision capacitor components are placed in operative engagement by first fixturing the stator 32 within the housing 12. The fixturing process ensures that stator 32 is concentrically positioned within the housing 12. Once the stator 32 is positioned correctly, at the end of the housing 12, the insulating disc 40 having metallized portions 46 and 47 is positioned over the end of both the housing 12 and the stator 32. In particular, the housing terminal 13 on the housing 12 is positioned in the edge hole 42 in the insulating disc 40. Similarly, the stator terminal 38 is positioned in the hole 44 in the insulating disc 40. The metallized portion 47, near the center of the insulating disc 40, is then soldered to the base 35 of the stator 32. The metallized portion 46, near the circumference of the top surface of the insulating disc 40 is soldered to the housing 12. Before the solder hardens, the insulating disc 40 is allowed to seek its own position with respect to the stator 32 and the housing 12. It is only necessary that the housing terminal 13 and the stator terminal 38 extend through the edge hole 42 and the hole 44 in the insulating disc and that the metallized portions 46 and 47 contact the housing 12 and the bottom of the stator 32 to a substantial degree. It is important that solder from metallized portions 46 and 47 does not interconnect the stator 32 and the housing 12 and create an electrical connection between those two components. This problem is prevented by the presence of solder traps 49 and 50 in the insulating disc 40. The solder that is squeezed out from under the housing 12 and the stator 32 will move into the traps 49 and 50 and not electrically connect the stator 32 and the housing 12.

The final step in the parts assembly involves screwing the rotor 14 into the housing 12. The spring 52 is placed within the confines of the ribs 22 on the rest 23 generally directly under the threads 29 at the end of the ribs 22. The outward force of the spring 52 is greater than the staying force of the ribs 22. Thus, to prevent rib 22 breakage, the rotor 14 must be confined in a sleeve while placing the spring 52 within the ribs 22. The rotor can then be screwed into the housing 12. The capacitor 10 is complete.

In operation, capacitance is produced between the rotor 14 and the stator 32 and is, of course, a function of the amount of overlap of tubes 18 and 34. The spring 52 biases the threaded ribs 22 outwardly toward the housing 12. The outward torque of the spring not only ensures that satisfactory electrical contact is maintained between the rotor 14 and the housing 12 but creates torque as well. The bias between the threads 29 of the rotor 14 and the housing 12 also keeps the rotor 14 position constant when the rotor is not moved manually. When the rotor 14 is fully screwed into the housing 12, by use of the screwdriver slot 30, contact between the stator 32 and the rotor 14 is prevented by contact between the insulating stop 33 and the closed end 21 of the innermost rotor tube. At the other extreme, the rotor 14 can be fully screwed out of the housing 12 if, for any reason, the capacitor must be inspected internally. Impending separation between the rotor 14 and the housing 12 is easily determinable.

The terminal 13 on the housing 12 and the terminal 38 on the stator 32 can be positioned in holes in a circuit board and connected to electrical wires with little difficulty. In addition, the insulating disc 40 insulates the capacitor 10 from any circuit board upon which it is mounted.

Figure 4:
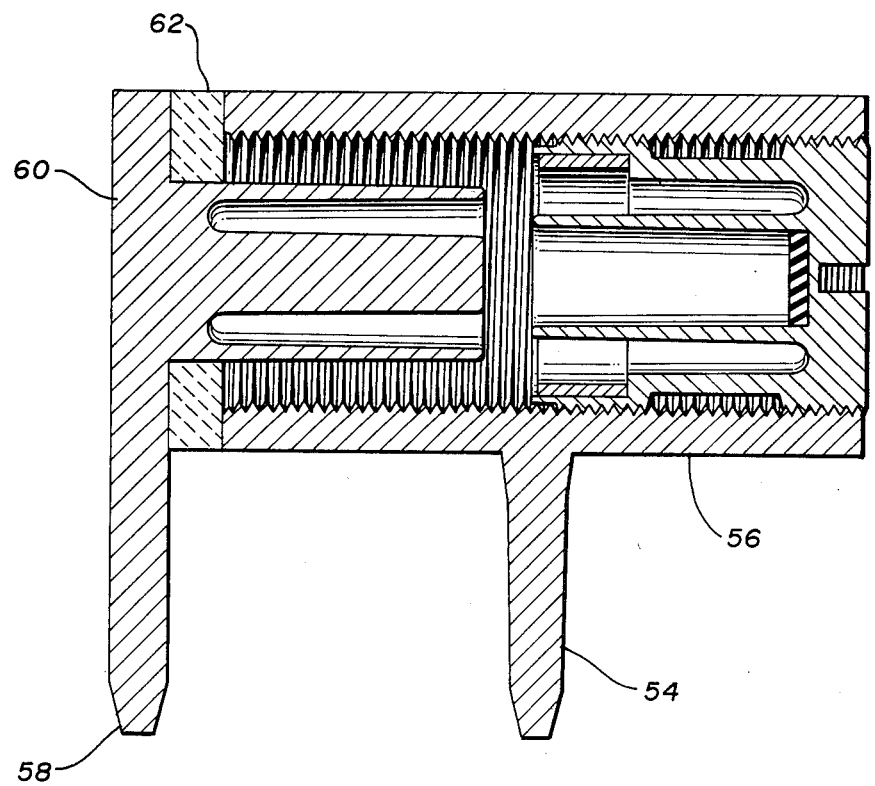
FIG. 4 is another embodiment of a capacitor in accordance with the present invention.

As is seen in FIG. 4 a horizontally mountable version of the capacitor 10 is contemplated for those applications where a low profile is required. The embodiment in FIG. 4 operates the same in all respects as does the capacitor 10 in FIGS. 1-3. Structurally, as is evident, the embodiment in FIG. 4 is different in that the terminal 54 on the housing 56 extends perpendicularly to the longitudinal axis of the housing 56 as does the terminal 58 on the stator 60. As a result of the shape of the stator 60 the insulating disc 62 has only one opening, large enough for the tubes 64 of the stator 60 to extend through. In addition, there is metallization on both sides of the insulating disc 62. On the side toward the housing, metallization extends around the outer edge of that surface. On the opposite side, an area of metallization similar to that for the housing 56 is present in order to solder the stator 60 to the insulating disc 62.

The resulting capacitor 10 is an inexpensively and economically produced device, which, with appropriate thread density, provides a high precision, low cost multiturn capacitor. Having thus described the invention it will be obvious to those skilled in the art that certain variations such as the above can be made. Each such modification is intended to be within the scope and intendment of the appended claims.

I claim:

1. An adjustable air dielectric capacitor for an electrical circuit comprising:

a hollow cylindrical internally threaded housing having means connectable to an electrical circuit;

a ceramic insulating disc secured over one end of the housing;

a cylindrical stator in the form of a plurality of concentrically positioned tubular plates connected at one end, the stator being concentrically fixed inside the housing and secured to the insulaitng disc, the stator having means connectable to an electrical circuit;

a cylindrical rotor in the form of a plurality of concentrically positioned tubular plates connected at one end, including an outer plate having an interior surface and being in the form of a plurality of ribs, the rotor being concentrically positioned inside the housing in operative relation to the stator, and in threaded engagement with the housing;

spring means in operative engagement with the interior surface of the outer rotor plate to bias the ribs, in a cantilever fashion, toward the housing whereby electrical contact between the rotor and the housing is assured and torque is created between the outer rotor plate and the housing to prevent unwanted rotor motion within the housing.

2. The capacitor as defined in claim 1, the spring means being circular and of less than one full turn.

3. The capacitor as defined in claim 1, the housing, rotor, and stator being die-cast metal components.

4. The capacitor of claim 3 wherein the housing is diecast as a single unit.

5. The capacitor of claim 3 wherein the rotor is die-cast as a single unit.

6. The capacitor of claim 3 wherein the stator is die-cast as a single unit.

7. The capacitor as defined in claim 1, the means connectable to an electrical circuit extending through the insulating plate.

8. The capacitor as defined in claim 1, the rotor having adjustment means accessible externally to the housing.

9. The capacitor as defined in claim 1, the insulating disc having separate metallization pads for the housing and the stator.

10. The capacitor as defined in claim 9, the housing and the stator being secured to the metallized pads on the insulating disc by solder.

11. The capacitor of claim 10 wherein the insulating disc further comprises at least one cavity to trap solder to prevent electrical shorting between the stator and the rotor.

12. The capacitor of claim 1 wherein the housing is internally threaded through its length to provide better support and improved adjustability.

13. The capacitor of claim 1 wherein the housing fully encloses the capacitor to prevent foreign matter from entering the unit.

14. The capacitor of claim 1 wherein the rotor is in constant electrical contact with the housing and wherein the means for connecting the housing to an electrical circuit and the means for connecting the stator to the electrical circuit extend in the direction of the longitudinal axis of the capacitor.

15. The capacitor of claim 1 wherein the rotor is in constant electrical contact with the housing and wherein the means for connecting the housing to an electrical circuit and the means for connecting the stator to the electrical circuit extend in a perpendicular direction to the longitudinal axis of the capacitor.

* * * * *